US011999561B2

(12) United States Patent
Liao et al.

(10) Patent No.: US 11,999,561 B2

(45) Date of Patent: Jun. 4, 2024

(54) THERMAL SENSING TYPE GARBAGE CAN COVER AND GARBAGE CAN

(71) Applicant: Jiangmen Jinlong High Technology Industrial Co., Ltd., Guangdong (CN)

(72) Inventors: Jinsheng Liao, Guangdong (CN); Weitang Lu, Guangdong (CN)

(73) Assignee: Jiangmen Jinlong High Technology Industrial Co., Ltd., Jiangmen (CN)

(*) Notice: Subject to any disclaimer, the term of this patent is extended or adjusted under 35 U.S.C. 154(b) by 985 days.

(21) Appl. No.: 16/938,685

(22) Filed: Jul. 24, 2020

(65) Prior Publication Data

US 2021/0362947 A1 Nov. 25, 2021

(30) Foreign Application Priority Data

May 19, 2020 (CN) ......................... 202020844322.5

(51) Int. Cl.
*B65F 1/16* (2006.01)

(52) U.S. Cl.
CPC .......... *B65F 1/1638* (2013.01); *B65F 1/1623* (2013.01); *B65F 2001/1653* (2013.01); *B65F 2210/20* (2013.01)

(58) Field of Classification Search
CPC ....................................................... E05D 13/12
USPC .......................................... 16/285, 259, 307
See application file for complete search history.

(56) References Cited

U.S. PATENT DOCUMENTS

| | | | | | |
|---|---|---|---|---|---|
| 4,458,379 | A * | 7/1984 | Shelton | E05F 1/1215 16/349 |
| 10,696,477 | B1 * | 6/2020 | Shek | B65F 1/1638 |
| 2011/0074316 | A1 * | 3/2011 | Shek | B65F 1/1607 318/3 |
| 2020/0079587 | A1 * | 3/2020 | Han | B65F 1/1638 |
| 2021/0262273 | A1 * | 8/2021 | Stranger | E05F 15/71 |

FOREIGN PATENT DOCUMENTS

| | | | | |
|---|---|---|---|---|
| CA | 3087343 A1 * | 9/2013 | B65F 1/04 |
| CN | 103807286 A * | 5/2014 | A47K 13/12 |
| CN | 105346892 A * | 2/2016 | |
| CN | 206456835 U * | 9/2017 | B65F 1/06 |
| DE | 202010008577 U1 * | 2/2011 | B65F 1/1607 |
| EP | 2289821 A1 * | 3/2011 | B65F 1/1607 |

* cited by examiner

*Primary Examiner* — Mollie Impink

(74) *Attorney, Agent, or Firm* — Chernoff, Vilhauer, McClung & Stenzel LLP

(57) ABSTRACT

Disclosed is a garbage can, a garbage can cover on the garbage can includes a shell, a motor base, a cover, a first connecting rod and a second connecting rod, wherein the shell is hinged with a rotating rod; the motor base is fixed on the shell, a motor is installed in the motor base, and the motor is connected with a rotating shaft; the cover covers on the shell and is fixedly connected with the rotating rod; the first connecting rod is fixedly connected with the rotating shaft; two ends of the second connecting rod are respectively hinged with the first connecting rod and the cover; a first torsional spring and a second torsional spring are symmetrically arranged about the second connecting rod on the rotating rod, one end of the first torsional spring and one end of the second torsional spring abut against the shell.

7 Claims, 5 Drawing Sheets

THERMAL SENSING TYPE GARBAGE CAN COVER AND GARBAGE CAN

TECHNICAL FIELD

The present disclosure relates to a garbage can of a daily necessity, and more particularly, to a thermal sensing type garbage can cover and a garbage can.

BACKGROUND

A sensitive garbage can includes an opening and closing system of a cover controlled by a circuit chip, and the opening and closing system of the cover consists of a sensor and a driving system. When an object enters a range of a sensitive area, the sensor will detect the existence of an obstacle and feed back a signal to the opening and closing system of the cover, and the opening and closing system of the cover receiving an instruction may control automatic opening of the cover. When the object leaves the range of the sensitive area, the sensor which does not detect the obstacle will also feed back a signal to the opening and closing system of the cover, so that the opening and closing system of the cover receiving an instruction controls automatic closing of the cover. The sensitive garbage can is powered by an internal power supply such as a battery, with low power consumption, and the power supply or an external power supply does not need to be changed frequently. Therefore, a user does not need to control opening and closing of the cover by hand pressing or foot pressing, and is able to throw garbage more easily and conveniently.

On one hand, the sensor of the existing sensitive garbage can is usually an infrared detector, and the sensitive garbage can using this sensor is easy to judge an ordinary object with a lower temperature and a human body with a higher temperature as the obstacles. Therefore, when the ordinary object enters the sensitive area of this sensitive garbage can, the garbage can cover may still be opened and closed automatically, thus increasing power consumption of the internal power supply and reducing a whole service life of the garbage can cover and the garbage can. On the other hand, the existing sensitive garbage can is usually driven by a DC motor assisted by a spring at an output end. When a heavy cover is driven, an opening and closing process of the garbage can cover is poor in stability during a whole opening and closing movement due to an excessively heavy weight of the cover. Furthermore, unexpected situations such as tilting and overturning of the garbage can easily occur due to unbalanced stress of the garbage can as a whole.

At present, it is urgent to provide a sensitive garbage can and a cover thereof which are able to improve the stability of the opening and closing process of the cover and a judgment accuracy of the opening and closing system for controlling the opening and closing of the cover.

SUMMARY

The present disclosure is intended to solve at least one of the technical problems in the prior art. Therefore, the present disclosure provides a garbage can cover, which is able to strengthen supporting to the cover, and improve a stability of the cover and a judgment accuracy of an opening and closing system for controlling opening and closing of the cover.

The present disclosure also provides a garbage can with the above garbage can cover.

A garbage can cover according to an embodiment of a first aspect of the present disclosure includes a shell, the shell being hinged with a rotating rod; a motor base fixed on the shell, a motor being installed in the motor base, and the motor being connected with a rotating shaft driven by the motor; a cover covering on the shell, the cover being fixedly connected with the rotating rod; a first connecting arm fixedly connected with the rotating shaft; a second connecting arm with one end hinged with the first connecting arm and the other end rotatably connected with the rotating rod; and a thermal sensing device electrically connected with the motor, wherein a first torsional spring and a second torsional spring are sleeved on the rotating rod, the first torsional spring and the second torsional spring are symmetrically arranged along the second connecting arm, one end of the first torsional spring and one end of the second torsional spring abut against the shell, and the other end of the first torsional spring and the other end of the second torsional spring support the cover from a position below the cover; and a third torsional spring is sleeved and fixed on the rotating shaft, and an end portion of the third torsional spring is fixed on the motor base.

According to some embodiments of the present disclosure, the motor base is provided with a plurality of receiving holes, the plurality of receiving holes are arranged around an axis of the rotating shaft, and the end portion of the third torsional spring is inserted into the receiving hole for fixing.

According to some embodiments of the present disclosure, the first torsional spring is sleeved on the rotating rod, the first torsional spring is provided with a first abutting end and a second abutting end, a rib is arranged in the shell, the first abutting end passes through the rib, and the second abutting end abuts against a lower portion of the cover.

According to some embodiments of the present disclosure, the second torsional spring is sleeved on the rotating rod, the second torsional spring is provided with a third abutting end and a fourth abutting end, a rib is arranged in the shell, the third abutting end passes through the rib, and the fourth abutting end abuts against a lower portion of the cover.

According to some embodiments of the present disclosure, the cover includes an upper cover, a middle cover and a lower cover which are sequentially arranged from top to bottom, and the motor base is arranged between the middle cover and the lower cover.

According to some embodiments of the present disclosure, the upper cover, the middle cover, and the lower cover are connected and fixed by fastening connection or snap connection.

The present disclosure further provides a garbage can with the above garbage can cover. The garbage can according to an embodiment of a second aspect of the present disclosure includes the garbage can cover according to any one of the above items, and the garbage can includes a can body and the garbage can cover according to the first aspect of the present disclosure.

According to some embodiments of the present disclosure, the garbage can further includes the thermal sensing device arranged on a front surface of the can body and electrically connected with the motor.

According to some embodiments of the present disclosure, the garbage can further includes a Hall sensor arranged at a middle portion of a front end of the cover and a corresponding position on the can body.

According to some embodiments of the present disclosure, the garbage can further includes two handles arranged at corresponding positions on two sides of the can body.

The garbage can according to the embodiment of the present disclosure has at least the following beneficial effects: the motor drives the first connecting arm to swing, so as to drive the second connecting arm to support the cover, the cover rotates around the rotating rod, after the cover is turned up, and the first torsional spring and the second torsional spring which are correspondingly arranged respectively abut against the cover and the shell to support the cover, thus reducing a load on the motor and improving a stability of the cover; and meanwhile, the thermal sensing device is used, which is able to avoid judging a low-temperature ordinary object as an object that the can body needs to be opened, thus improving a judgment accuracy of an opening and closing system for controlling opening and closing of the cover, reducing energy consumption of the garbage can, and prolonging a normal service life of the garbage can.

The additional aspects and advantages of the present disclosure will be partially provided in the following description, and will partially be apparent in the following description, or learned by practice of the present disclosure.

BRIEF DESCRIPTION OF THE DRAWINGS

The above and/or additional aspects and advantages of the present disclosure will be apparent and easily understood from the description of the embodiments with reference to the following accompanying drawings, wherein.

DETAILED DESCRIPTION

Figure 1:
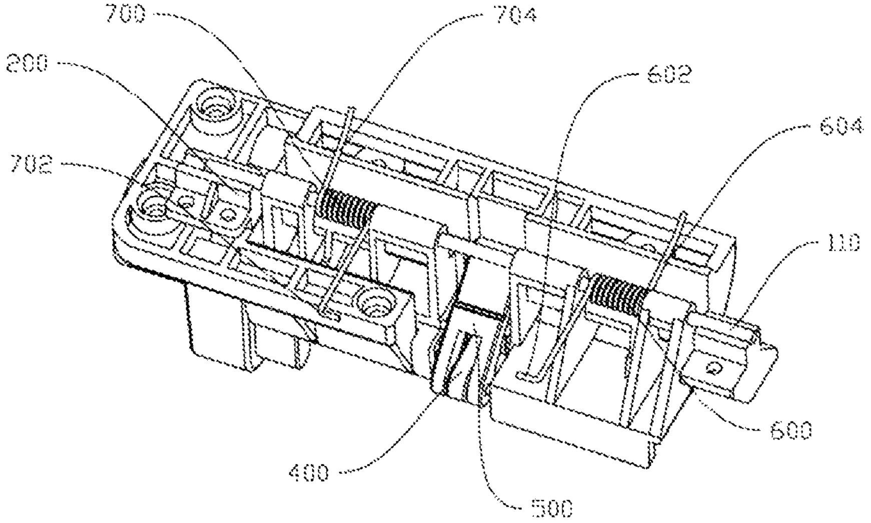
FIG. 1 is an overall diagram of a rotating structure of a garbage can cover of an embodiment of the present disclosure.

The embodiments of the present disclosure are described in detail hereinafter. Examples of the embodiments are shown in the accompanying drawings. The same or similar reference numerals throughout the accompanying drawings denote the same or similar elements or elements having the same or similar functions. The embodiments described hereinafter with reference to the accompanying drawings are exemplary and are only used to explain the present disclosure, but should not be understood as limiting the present disclosure.

The use of any and all examples, or exemplary languages (e.g., "such as") herein is only intended to better illustrate one or more embodiments, and is not intended to limit the scope of the claim subject unless otherwise stated. Any language in the description should not be explained as representing any claim subject that is not required to be protected, but is necessary for the realization of the claim subject.

The terms used to indicate the orientation or direction of travel should not be regarded as limitations. Therefore, the terms such as "front", "back", "rear", "side", "up", "down", "upper", "lower", "top", "bottom", "forward", "backward", "toward", "far side", "near side", "inside", "outside" and their synonyms, antonyms, and derivatives are chosen for convenience only, unless otherwise indicated in the context. One or more inventors may provide exemplary embodiments of various claim subjects in any particular manner, and the claim subject is intended to include this manner.

In the context of describing various embodiments (especially in the context of the claims), the use of "a", "an", "said" and/or similar terms should be explained to include both singular and plural cases, unless otherwise stated herein or explicitly contradicted herein. Unless otherwise mentioned, the terms "comprise", "have", "include" and "contain" should be explained as the open terms (which have the meaning of "include but not limited to").

In the description of the present disclosure, the terms arrangement, installation, connection, and the like should be understood in broad sense unless otherwise specified and defined. The specific meaning of the above terms in the present disclosure may be reasonably determined according to specific contents of the technical solutions by those skilled in the art.

Figure 2:
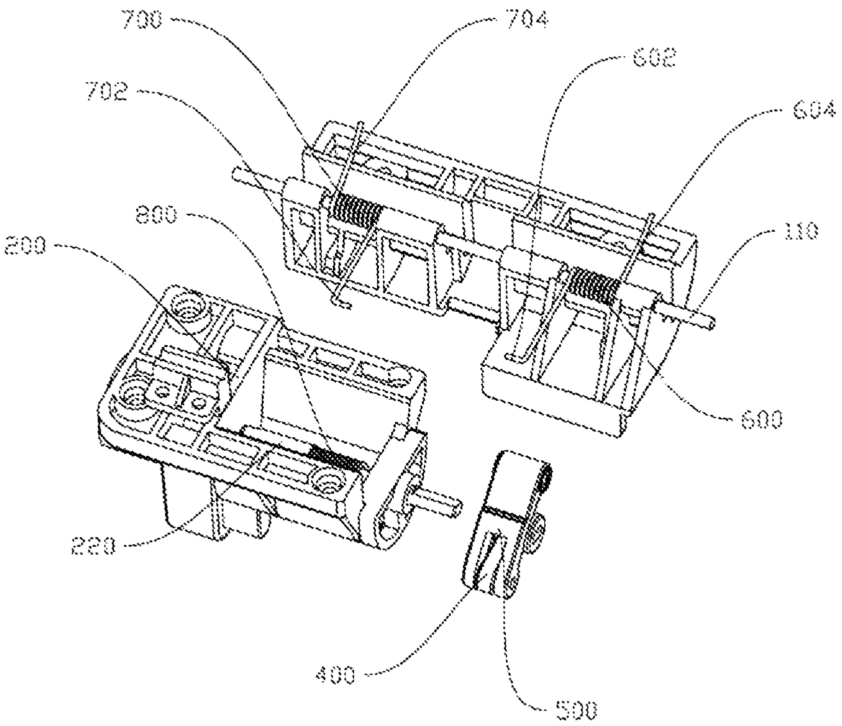
FIG. 2 is an exploded diagram of the rotating structure of the garbage can cover of an embodiment of the present disclosure.
Figure 3:
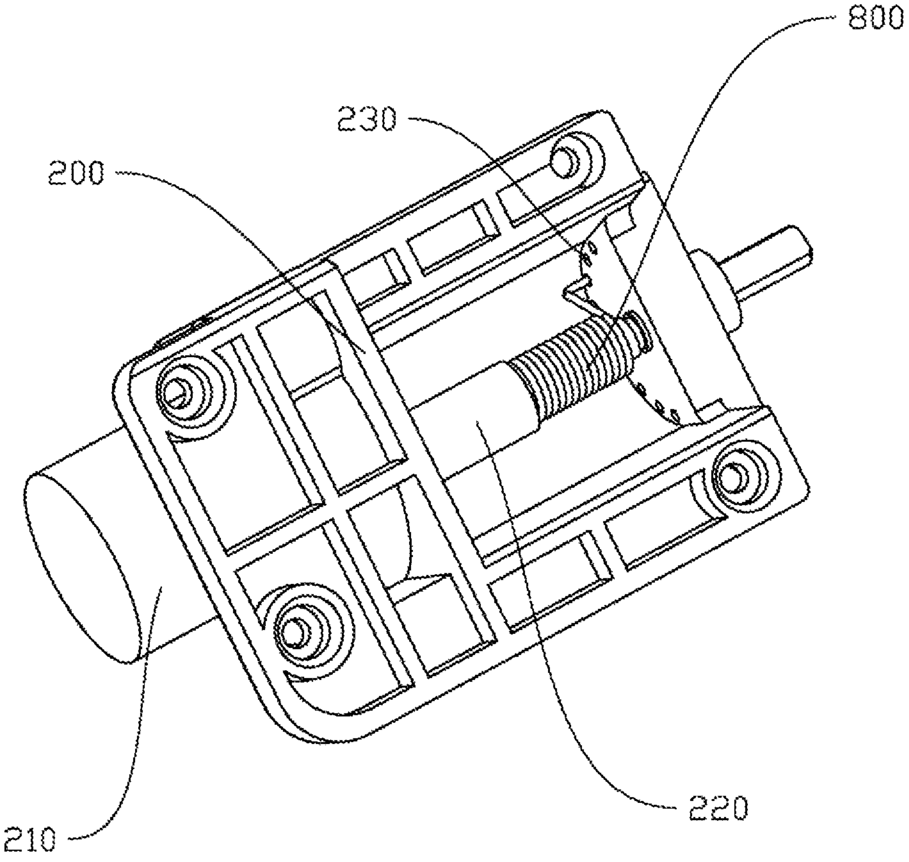
FIG. 3 is a diagram illustrating an installation structure of a motor base of an embodiment of the present disclosure.

With reference to FIG. 1 to FIG. 3, a garbage can cover according to the embodiment of the first aspect of the present disclosure includes a shell 100, the shell 100 being hinged with a rotating rod 110; a motor base 200 fixed on the shell 100, a motor 210 being installed in the motor base 200, and the motor 210 being connected with a rotating shaft 220 driven by the motor 210; a cover 300 covering on the shell 100 and fixedly connected with the rotating rod 110; a first connecting arm 400 fixedly connected with the rotating shaft 220; a second connecting arm 500 with one end hinged with the first connecting arm 400 and the other end rotatably connected with the rotating rod 110; and a thermal sensing device 1000 electrically connected with the motor 210. A first torsional spring 600 and a second torsional spring 700 are sleeved on the rotating rod 110, the first torsional spring 600 and the second torsional spring 700 are symmetrically arranged along the second connecting arm 500, one end of the first torsional spring 600 and one end of the second torsional spring 700 abut against the shell 100, and the other end of the first torsional spring 600 and the other end of the second torsional spring 700 support the cover 300 from a position below the cover 300. A third torsional spring 800 is sleeved and fixed on the rotating shaft 220, and an end portion of the third torsional spring 800 is fixed on the motor base 200.

The motor 210 drives the first connecting arm 400 to swing through the rotating shaft 220 during use, thus driving the second connecting arm 500 to support the cover 300, and the cover 300 rotates around the rotating rod 110. After the cover 300 is turned up, the first torsional spring 600 abuts against the cover 300 and the shell 100 respectively to support the cover 300. Meanwhile, a pressure loaded on the third torsional spring 800 is released when the rotating shaft 220 rotates, so that the third torsional spring 800 generates a torque opposite to a rotating direction to the rotating shaft 220, so as to support the rotating shaft 220. Pairs of the first torsional spring 600, the second torsional spring 700 and the third torsional spring 800 support the cover 300 and the rotating shaft 220 respectively, so as to reduce a load on the motor 210 and improve a stability of the cover 300.

In addition, since the first torsional spring 600 and the second torsional spring 700 are symmetrically arranged along the rotating rod 110, a torsional force generated on the rotating shaft 220 of the motor 210 may be evenly transferred and distributed to the first torsional spring 600 and the second torsional spring 700 located on both sides of the rotating rod 110 and then further transmitted to the cover 300 during rotation of the cover 300, thus avoiding an unbalanced stress situation, and further improving the stability of the cover 300 during rotation of the cover 300.

It should be mentioned that in order to improve an accuracy, a stepping motor 210 is selected as the motor 210.

According to some embodiments of the present disclosure, the motor base 200 is provided with a plurality of receiving holes 230, the plurality of receiving holes 230 are arranged around an axis of the rotating shaft 220, and the end portion of the third torsional spring 800 is inserted into the receiving hole 230 for fixing. A torsion degree of the third torsional spring 800 may be adjusted by changing the insertion hole 230 into which the end portion of the third torsional spring 800 is inserted, thus changing elastic potential energy accumulated on the third torsional spring 800, and then changing a tightness thereof to meet requirements of different situations.

According to some embodiments of the present disclosure, the first torsional spring 600 is sleeved on the rotating rod 110, and the first torsional spring 600 is provided with a first abutting end 602 and a second abutting end 604. A rib is arranged in the shell 100, the first abutting end 602 passes through the rib, and the second abutting end 604 abuts against a lower portion of the cover 300.

According to some embodiments of the present disclosure, the second torsional spring 700 is sleeved on the rotating rod 110, and the second torsional spring 700 is provided with a third abutting end 702 and a fourth abutting end 704. A rib is arranged in the shell 100, the third abutting end 702 passes through the rib, and the fourth abutting end 704 abuts against a lower portion of the cover 300.

Figure 4:
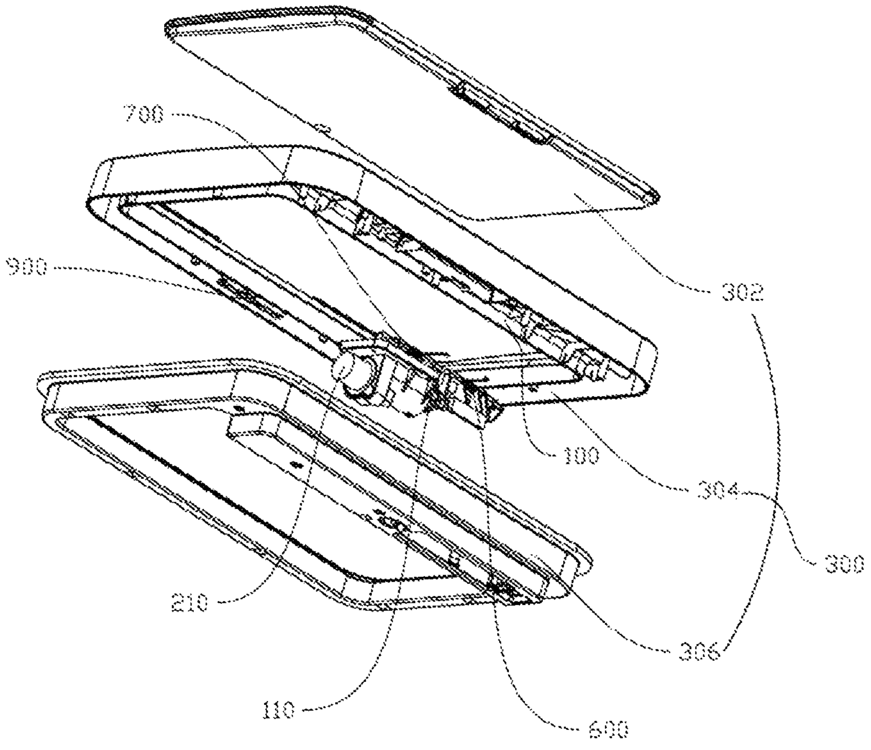
FIG. 4 is an overall diagram of a garbage can cover of an embodiment of the present disclosure.
Figure 5:
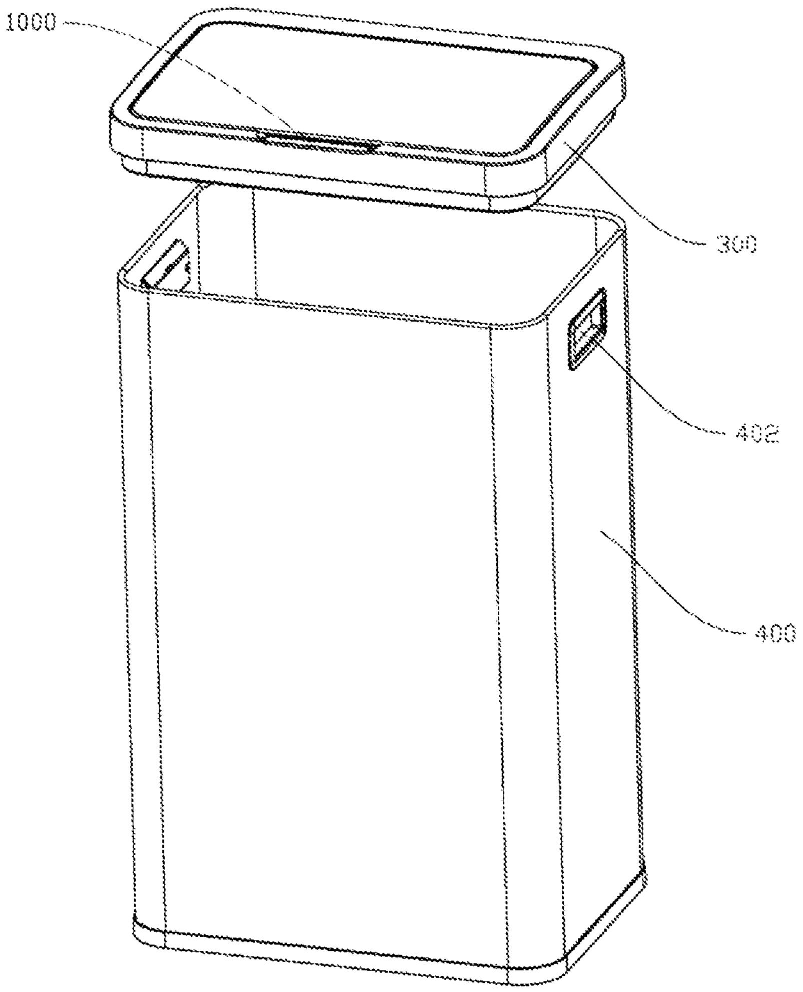
FIG. 5 is an overall diagram of a garbage can of an embodiment of the present disclosure.

With reference to FIG. 4 to FIG. 5, according to some embodiments of the present disclosure, the cover 300 includes an upper cover 302, a middle cover 304 and a lower cover 306 which are sequentially arranged from top to bottom, and the motor base 200 is arranged between the middle cover 304 and the lower cover 306.

According to some embodiments of the present disclosure, the upper cover 302, the middle cover 304 and the lower cover 306 are connected and fixed by fastening connection or snap connection and combined into the cover 300 with a large mass.

The present disclosure further provides a garbage can with the above garbage can cover. The garbage can according to an embodiment of a second aspect of the present disclosure includes the garbage can cover according to any one of the above items, and the garbage can includes a can body 400 and the garbage can cover according to the first aspect of the present disclosure.

According to some embodiments of the present disclosure, the garbage can further includes the thermal sensing device 1000 arranged on a front surface of the can body 400 and electrically connected with the motor 210. The sensitive garbage can using this sensor is able to distinguish an ordinary object with a lower temperature from a human body with a higher temperature. Therefore, when the ordinary object with the lower temperature enters a sensitive area of the thermal sensing type garbage can, the garbage can cover will not be automatically opened and closed. Only when a part (a hand or a foot, etc.) of the human body with the higher temperature enters the sensitive area of the thermal sensing type garbage can, the garbage can cover may be automatically opened and closed, thus improving a judgment accuracy of an opening and closing system for controlling opening and closing of the cover, reducing electric energy consumption of an internal power supply, and prolonging an overall service life of the cover and the garbage can. Certainly, in order to meet requirements of different consumers and usage scenarios, the thermal sensing device 1000 used in the present disclosure may also be replaced by other infrared sensors.

According to some embodiments of the present disclosure, the garbage can further includes a Hall sensor 900 arranged at a middle portion of a front end of the cover 300 and a corresponding position on the can body 400. The cover 300 is able to be accurately butted and pressed on the can body 400 by the Hall sensor 900 during closing of the can cover 300, so as to prevent deviation during closing of the cover, thus affecting a sealing performance of the cover.

According to some embodiments of the present disclosure, the can body 400 further includes two handles 402 arranged at corresponding positions on two sides of the can body 400. The user is able to lift the whole garbage can through the handles 402, thus being convenient for carrying and other operations.

The embodiments of the present disclosure are described in detail with reference to the accompanying drawings above, but the present disclosure is not limited to the above embodiments, and various changes may also be made within the knowledge scope of those of ordinary skills in the art without departing from the purpose of the present disclosure.

What is claimed is:

1. A thermal sensing type garbage can cover, comprising:

a shell, the shell being hinged with a rotating rod;

a motor base fixed on the shell, a motor being installed in the motor base, and the motor being connected with a rotating shaft driven by the motor;

a cover covering on the shell, the cover being fixedly connected with the rotating rod;

a first connecting arm fixedly connected with the rotating shaft;

a second connecting arm with one end hinged with the first connecting arm and the other end rotatably connected with the rotating rod; and a thermal sensing device configured to control an opening and closing of the cover based on an object sensed, wherein a first torsional spring and a second torsional spring are sleeved on the rotating rod, the first torsional spring and the second torsional spring are arranged on opposite sides of the second connecting arm, one end of the first torsional spring and one end of the second torsional spring abut against the shell, and the other end of the first torsional spring and the other end of the second torsional spring support the cover from a position below the cover; and a third torsional spring is sleeved and fixed on the rotating shaft, and an end portion of the third torsional spring is fixed on the motor base.

2. The garbage can cover of claim 1, wherein the motor base is provided with a plurality of receiving holes, the plurality of receiving holes are arranged around an axis of the rotating shaft, and the end portion of the third torsional spring is inserted into the receiving hole for fixing.

3. The garbage can cover of claim 1, wherein the cover comprises an upper cover, a middle cover and a lower cover which are sequentially arranged from top to bottom, and the motor base is arranged between the middle cover and the lower cover.

4. A garbage can, comprising a can body and a thermal sensing type garbage can cover, the garbage can cover comprising:

a shell, the shell being hinged with a rotating rod;

a motor base fixed on the shell, a motor being installed in the motor base, and the motor being connected with a rotating shaft driven by the motor;

a cover covering on the shell, the cover being fixedly connected with the rotating rod;

a first connecting arm fixedly connected with the rotating shaft;

a second connecting arm with one end hinged with the first connecting arm and the other end rotatably connected with the rotating rod; and a thermal sensing device electrically connected with the motor, wherein a first torsional spring and a second torsional spring are sleeved on the rotating rod, the first torsional spring and the second torsional spring are arranged on opposite sides of the second connecting arm, one end of the first torsional spring and one end of the second torsional spring abut against the shell, and the other end of the first torsional spring and the other end of the second torsional spring support the cover from a position below the cover; and a third torsional spring is sleeved and fixed on the rotating shaft, and an end portion of the third torsional spring is fixed on the motor base.

5. The garbage can of claim 4, further comprising the thermal sensing device arranged on a front surface of the can body and configured to control an opening and closing of the cover based on an object sensed.

6. The garbage can of claim 5, further comprising a Hall sensor arranged at a middle portion of a front end of the cover and a corresponding position on the can body.

7. The garbage can of claim 5, further comprising two handles arranged at corresponding positions on two sides of the can body.

* * * * *